United States Patent

[11] 3,569,626

[72] Inventors Hisakichi Michishita; Kazuo Kawai, Tokyo-to; Sotokichi Shintani, Fukuoka-machi, Saitama-ken, Japan
[21] Appl. No. 656,840
[22] Filed July 28, 1967
[45] Patented Mar. 9, 1971
[73] Assignee Kokusai Denshin Denwa Kabushiki Kaisha Tokyo-to, Japan
[32] Priority Aug. 1, 1966
[33] Japan
[31] 41-50109

[54] REFERENCE CARRIER WAVE SYNCHRONIZING SYSTEM
7 Claims, 13 Drawing Figs.

[52] U.S. Cl. .......... 178/67, 178/69.5, 325/30
[51] Int. Cl. .......... H04l 27/24
[50] Field of Search .......... 325/320, 45, 47, 30, 341, 419; 178/69.5; 179/15 (P); 178/67, 88; 179/15(OR), 15 (Synch), 15(P)

[56] References Cited
UNITED STATES PATENTS
3,117,280 1/1964 Palmer .......... 178/69.5

*Primary Examiner*—Robert L. Griffin
*Assistant Examiner*—Albert J. Mayer
*Attorneys*—Robert E. Burns and Emmanuel J. Lobato

ABSTRACT: A reference carrier wave synchronizing system for synchronizing a plurality of receiving reference waves with a plurality of transmitted, phase-modulated telegraphic waves having harmonic frequencies of a standard low frequency and each assuming $2^n$ quantum phase positions in accordance with the number $n$ of telegraph channels to be transmitted on each of the telegraphic waves; where the said synchronization is performed by compensating separately the fluctuations of instantaneous phase positions of the transmitted, phase-modulated waves caused in transmission medium and caused from the deviation in the phase or frequency of the standard low frequency.

REFERENCE CARRIER WAVE SYNCHRONIZING SYSTEM

This invention relates to reference carrier wave synchronizing system and more particularly to apparatus for synchronizing a plurality of receiving reference waves with a plurality of transmitted, phase-modulated telegraphic waves each assuming $2^n$ quantum phase positions in accordance with the number $n$ of telegraph channels to be transmitted on each of the telegraphic waves.

As the frequency division multiplex communication system of the type, there is one system using fixed-reference phase-modulated waves the quantum phase positions of each of which is predetermined in accordance with the polarity of a single telegraph signal or the combinations of polarities of a plurality of telegraphic signals to be transmitted, or the other system using differential phase-modulated waves in each of which relative phase between respective two adjacent signal elements are determined in accordance with said polarity or combination of polarities. Accordingly, in case of receiving and demodulating the phase-modulated wave transmitted, the wave of the former system requires a reference carrier wave having a constant phase position of fixed-reference, and the wave of the later system requires, by way of example, a reference carrier wave assuming successively phase positions each of which corresponds to the phase position of the immediately preceding signal element. However, it is very difficult to generate the reference carrier waves sufficiently meeting the above-mentioned requirements since there are instantaneous breakings of transmission line, disturbance by noise in transmission medium, and fluctuations of instantaneous phase positions transmission lines. In case of the instantaneous breakings of transmission line, it is impossible to avoid erroneous detection since no carrier wave is transmitted. However, it is desirable that the correct reference carrier wave is generated as soon as possible after determination of the instantaneous breaking of transmission line so that the number of erroneously detected characters is suppressed to a minimum value. In this connection, the restoration to normal demodulation operation can be more rapidly performed in the fixed-reference phase-modulation due to the predetermined quantum phase positions of this modulation principle. In case of the differential phase-modulation, the correct demodulation operation would be carried out after a signal element just succeeding to a signal element the phase position of which is correctly detected. In actual case, however, it is very difficult to detect the correct phase position of the fixed-reference of the phase-modulated wave on account of remains of the above-mentioned phenomena, such as noise in transmission medium or the fluctuation of instantaneous phase position of the carrier wave. Accordingly, it is general to the conventional system using the fixed-reference phase-modulation that a considerable time is necessary to generate the correct reference carrier wave. On the contrary, if the phase position of a preceding signal element is correctly detected in the differential phase-modulated wave, signal elements succeeding to the correctly detected preceding element would be correctly detected. In view of the above-mentioned conditions of the conventional arts, the restoration to the normal demodulation operation can be more rapidly performed in the differential phase-modulation than the fixed-reference phase-modulation. Accordingly, the conventional phase-modulation can be actually realized in accordance with the differential phase-modulation only in disregard of the above-mentioned merits of the fixed-reference phase-modulation. The Rectiplex system (U.S. Pat. application Ser. No. 284,988 now U.S. Pat. No. 3,353,101) is one of the demodulation system of the differential phase-modulation.

As mentioned above, it is the important conditions for the normal, correct demodulation of the phase-modulated wave that the correct reference carrier wave is rapidly generated as soon as possible after determination of instantaneous breaking of the transmission line and that the correct reference carrier wave is always generated in spite of the noise and the fluctuation of instantaneous phase position in transmission medium. In order to meet the above-mentioned requirement, we joint inventors of this application has proposed in the U.S. Pat. application Ser. No. 577,952, now abandoned, a system for eliminating phase- and frequency-fluctuation included in a transmitted signal or signals. In application of this system and the Rectiplex system to conventional phase-modulation communication, however, the reference carrier waves to be employed for demodulating a plurality of phase-modulated waves are generally generated for each of the phase-modulated waves by use of respective carrier wave generators each of which is associated with the automatic phase control circuit. In view of the number of phase-modulated carrier waves which is approximately equal to 20 in a 3 kilocycle band, by way of example, the conventional demodulation devices have disadvantages, such as high cost and unnecessary complication. Moreover, stable transmission of the quantum phase positions whereby digital information transmission by the fixed-reference phase-modulation can be realized under the low error rate cannot be usually performed by the conventional transmission technique.

An object of this invention is to provide an apparatus for generating a plurality of reference carrier waves in a single generator.

Another object of this invention is to provide an apparatus for synchronizing a plurality of reference carrier waves generated from a single generator with a plurality of phase-modulated carrier waves transmitted.

Further object of this invention is to provide a reference carrier wave synchronizing system capable of realizing reliable digital information transmission by the fixed-reference phase-modulated waves.

Said objects and other objects of this invention can be attained by the reference carrier wave synchronizing system of this invention for synchronizing a plurality of receiving reference waves with a plurality of transmitted phase-modulated telegraphic waves having harmonic frequency of a fundamental low frequency and each assuming $2^n$ quantum phase positions in accordance with the number $n$ of telegraph channel or channels to be transmitted on each of the telegraphic waves, comprising an automatic phase control loop for synchronizing the phase position of an oscillator included in this loop with the phase position of a transmitted harmonic frequency of the fundamental low frequency, and carrier generation means for generating a plurality of said receiving reference waves by use of the output frequency of the oscillator.

In accordance with the feature of this invention, the synchronization operation of the system of this invention can be performed by compensating separately the fluctuations of instantaneous phase positions of the transmitted phase-modulated waves caused in transmission medium and caused from the deviation in phase or frequency of the fundamental low frequency.

The novel features of this invention are set forth with particularity in the appended claims, however this invention, both as to its constitution and operation together with other objects and advantages thereof, may best be understood by reference to the following description, taken in connection with the accompanying drawings, in which the same or equivalent parts are designated by the same characters, numerals and symbols as to each other, and in which:

Figure 1:
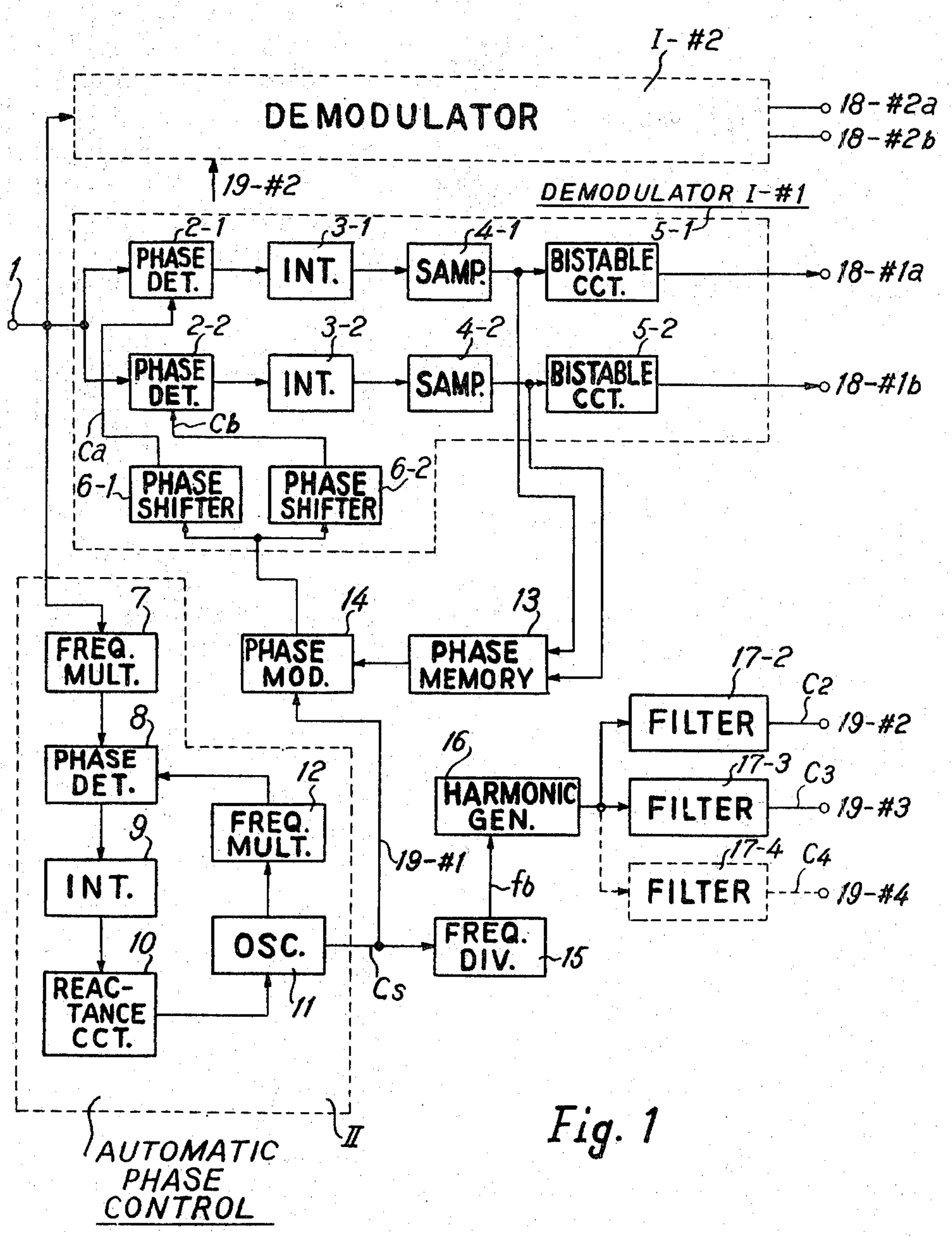
FIGS. 1, 2, 4A and 4B are block diagrams for illustrating respectively embodiments of the invention.

Referring to FIG. 1, an embodiment of this invention for generating a plurality of reference carrier waves to demodulate a plurality of differential phase-modulated telegraphic waves each having four quantum phase positions will be described. The differential phase-modulated telegraphic waves transmitted are applied through an input terminal 1 to demodulators I–01, I–02,.... to demodulate per each wave. Each of the demodulators comprises a pair of demodulation circuits in this case of four quantum phase positions and each of the demodulation circuits comprises a phase detector (2–1 or 2–2), a start-stop integrator (3–1 or 3–2), a sampler (4–1 or 4–2) and a bistable circuit (5–1 or 5–2). Reference carrier waves *Ca* and *Cb* are respectively applied to the phase-detectors 2–1 and 2–2 in each of which a phase difference between corresponding one of the transmitted phase-modulated waves and the reference carrier wave (*Ca* or *Cb*) is detected to produce a DC voltage the sign and magnitude of which correspond respectively to those of the phase difference. The start-stop integrator (3–1 or 3–2) integrates the DC output of the phase-detector (2–1 or 2–2) in a start-stop manner timed with the periods of signal elements of the phase-modulated telegraphic waves transmitted usually in bit synchronization. The operation of the start-stop integrator is carried out by use of timing information applied thereto but not shown for simple illustration. The sampler (4–1 or 4–2) is employed for converting the output of the integrator (3–1 or 3–2) to a pulse signal. The bistable circuits (5–1 or 5–2) produces a demodulated output signal at an output terminal (18–01*a* or 18–01*b*) by use of the output pulse of the sampler 4–1 or 4–2.

The reference carrier waves *Ca* and *Cb* are generated by use of the automatic control circuit II. This operation is as follows. The transmitted carrier waves are multiplied by four times in this case and then introduced to a phase detector 8. An automatic phase control loop is formed by this detector 8, an integrator 9 for integrating the output of the phase detector 8, a reactance circuit 10 for controlling the frequency of an oscillator 11 by use of the output of the integrator 9, the oscillator 11 generating the same frequency as that of one of the transmitted carrier waves, and a frequency multiplier multiplying, by four times, the frequency of the oscillator 11. The output *Cs* of the oscillator 11 is regulated to a phase position under control of the automatic phase control loop. A phase memory 13 stores the phase position of the just preceding code element by use of the output pulses of the demodulator I. A phase modulator 14 phase-modulates the output signal *Cs* of the oscillator 11 and applies its output to phase shifters 6–1 and 6–2. The reference carrier waves *Ca* and *Cb* are obtained at the respective output sides of the phase shifters 6–1 and 6–2.

The above-mentioned system is an example of the Rectiplex system (Copending U.S. Pat. application Ser. No. 284,988) for demodulating a differential phase-modulated wave having four quantum phase positions. In this prior art, an automatic phase control loop is provided for each of the transmitted phase-modulated waves. Since details of the principle of the Rectiplex are disclosed in the copending application, they are omitted in this case.

In this invention, a plurality of reference carrier waves $C_2$, $C_3$, $C_4$,.... are produced by use of the automatic phase control II of a phase-modulated single-wave (e.g.; $f_1$) transmitted. For such purpose of this invention, the output signal *Cs* is applied to a frequency divider 15 which produces a fundamental frequency $f_b$ of the reference carrier waves $C_2$, $C_3$, $C_4$,.... . The frequency $f_b$ is applied to a harmonic generator 16 to produce harmonic frequencies of the frequency $f_b$ which are to be derived from a plurality of filters 17–2, 17–3, 17–4.... respectively. The outputs of these filters 17–2, 17–3, 17–4,.. correspond respectively the reference carrier waves $C_2$, $C_3$, $C_4$,.... and are applied to respective demodulators I–02, I–03,.... through terminals 19–02, 19–03, 19–04,..... .

In the above-mentioned construction, if the phase position of the wave *Cs* is synchronized with a phase position required for demodulating the phase-modulated wave $f_1$, other reference carrier waves $C_2$, $C_3$, $C_4$,.... will be synchronized with required phase positions respectively. It is the reason for this that frequencies of the carrier waves $C_2$, $C_3$, $C_4$,.... are equal to $m/n$ of the frequency ($f_1$) of the wave *Cs*; where $n = f_1/o$ and $m$ is an integer.

Figure 2:
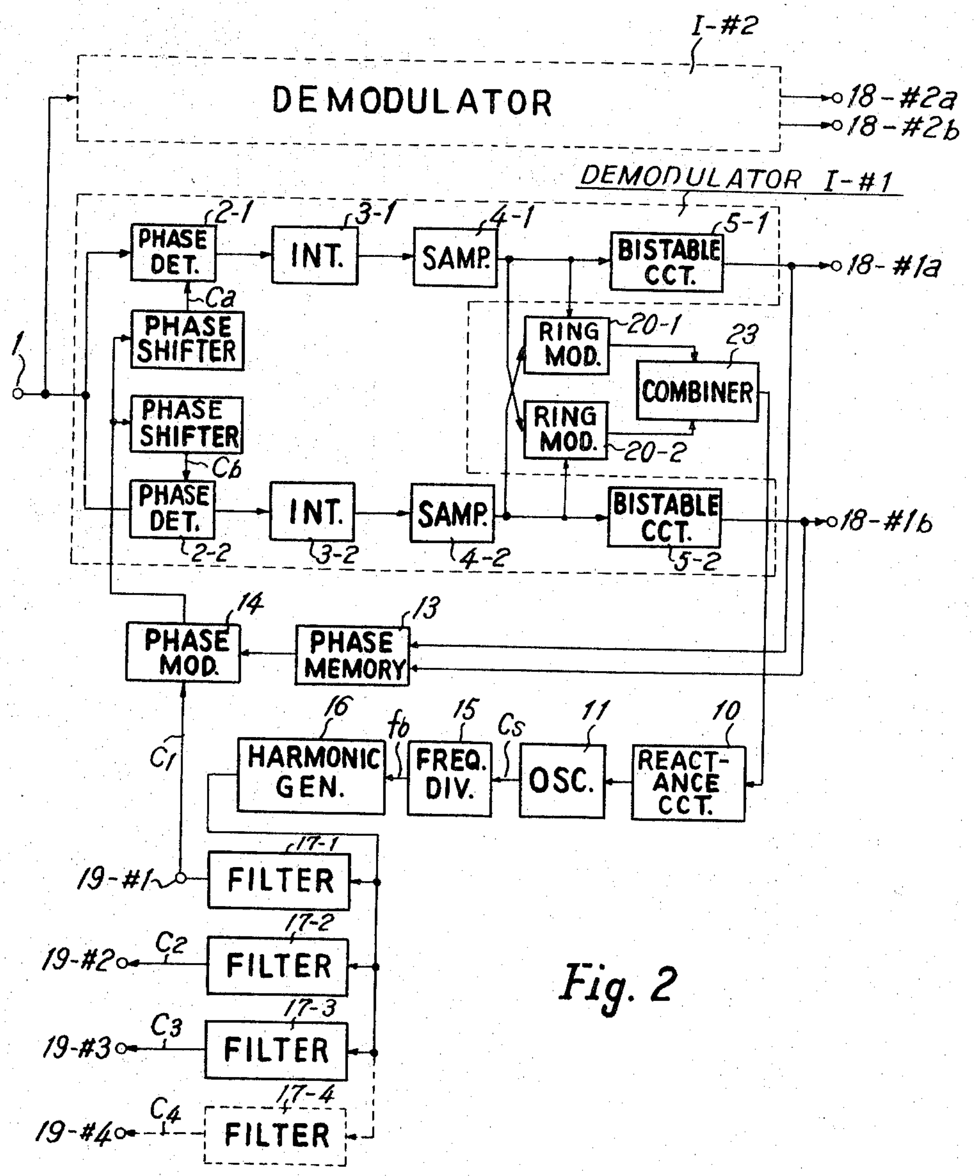

If the transmitted phase modulated telegraphic wave $f_1$ has quantum phase positions $2^n$ more than four, the automatic phase control circuit may be composed of, as are shown in FIG. 2, two ring modulators 20–1 and 20–2, a combiner 23, and reactance circuit 10 associated with the oscillator 11 to control the frequency thereof. Since the output levels of the samplers 4–1 and 4–2 change in accordance with phase difference between the phase-modulated wave (e.g.; $f_1$) and the reference carrier wave *Ca* or *Cb*, the phase of the oscillator 11 can be controlled by use of the phase difference which is detected by the ring modulators 20–1 and 20–2 and the combiner 23. Other circuitries are similar as those of FIG. 1. In this embodiment, the automatic phase control loop is formed as follows:

Oscillator (11) frequency divider (15) harmonic generator (16) filter (17) phase modulator (14) demodulator (I–01) ring-modulators (20–1 and 20–2) combiner (23) reactance circuit (10) oscillator (11).

As mentioned above, the automatic phase control loop of the embodiment shown in FIG. 1 or 2 operates so as to regulate the frequency of the wave *Cs* in accordance with the frequency of a transmitted, phase-modulated carrier wave (e.g.; $f_1$). However, the regulation operation of the automatic phase control loop has a delay time caused by the time constant of the integrator 9. Accordingly, if the phase position of the carrier wave $f_1$ fluctuates abruptly as the result of the phase-fluctuation in transmission line, the phase position of the wave *Cs* (i.e.; *Ca* and *Cb*) could not follow the abrupt phase-fluctuation of the transmitted carrier wave $f_1$. Moreover, since the carrier wave (e.g.; $f_1$) employed as the reference of the automatic phase control has usually a plurality of quantum phase positions ($2^n$), the phase position of the reference carrier wave (*Ca*, *Cb*,....) will synchronize with any of the quantum phase positions of the transmitted carrier wave ($f_1$). Although the indeterminate nature as to the phase positions of the reference carrier waves (*Ca*, *Cb*,....) is corrected by use of the phase modulator 14 controlled from the phase memory 13 so that the reference carrier waves (*Ca*, *Cb*,....) assume the correct phase positions, a signal element received at first will be erroneously detected in each demodulator I until performance of said correction operation. Embodiment of this invention to eliminate the above-mentioned deficiency will be described below.

Figure 3A:
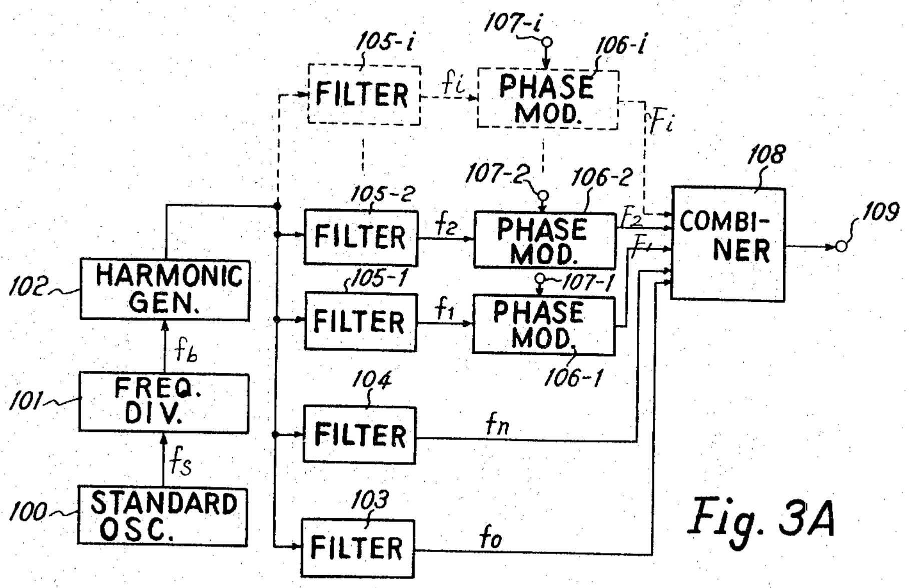
FIGS. 3A and 3B are block diagrams for illustrating respectively transmission systems for generating waves to be transmitted to the system of this invention.

To afford a better understanding of the reference carrier synchronization system of this invention, the sending side of the phase-modulated telegraphic waves will be first described. FIG. 3A shows an example of the sending side. In this arrangement, a standard oscillator 100 generates a standard low frequency $f_s$ (e.g.; 4.8kHz.). A frequency divider 101 produces a fundamental frequency $f_b$ (e.g.; 60Hz.) from the standard low frequency $f_s$. A harmonic generator 102 generates harmonic frequency of the fundamental frequency $f_b$. Each of Filters 103 and 104 has a narrow pass-band and select a harmonic frequency $f_o$ or $f_n$ which is usually allocated to one end side of the transmission frequency-band. Other filters 105–1, 105–2,...., 105–*i*,.... select respectively carrier-waves $f_1, f_2,...., f_i,....$ which have harmonic frequencies of the fundamental frequency $f_b$. Phase modulators 106–1, 106–2,...., 106–*i*,.... modulate the respective carrier wave $f_1$, $f_2,...., f_i,....$ in accordance with input telegraphic signals applied to input terminals 107–1, 107–2,...., 107–*i*,.... to produce phase modulated telegraphic waves $F_1, F_2,...., F_i,....$ . The harmonic frequencies $f_o$ and $f_n$ and the phase-modulated telegraphic waves $F_1, F_2,...., F_i,....$ are combined at a combiner 108 and send out of a terminal 109 connected to a transmission medium. In these transmitted waves, the phase-modulated telegraphic waves $F_1, F_2,...., F_i,....$ transmit telegraphic signals applied from the input terminals 107–1, 107–2,...., 107–*i*,...., and the harmonic frequencies $f_o$ and $f_n$ are employed for transmitting phase information which is contained in the phase-relation between phase-positions of the waves $f_o$ and $f_n$. This phase information is not affected by deviation of the phase or frequency of the fundamental frequency $f_b$ and by phase-fluctuations of the waves $f_o$ and $f_n$ in transmission medium, since the phase information is contained in the phase relation and the phase fluctuation in transmission medium occurs at the same magnitude and polarity as to all the transmitted waves as the result of our experimental test of some actual oversea transmission lines. This is an important feature of this invention.

Figure 4A:
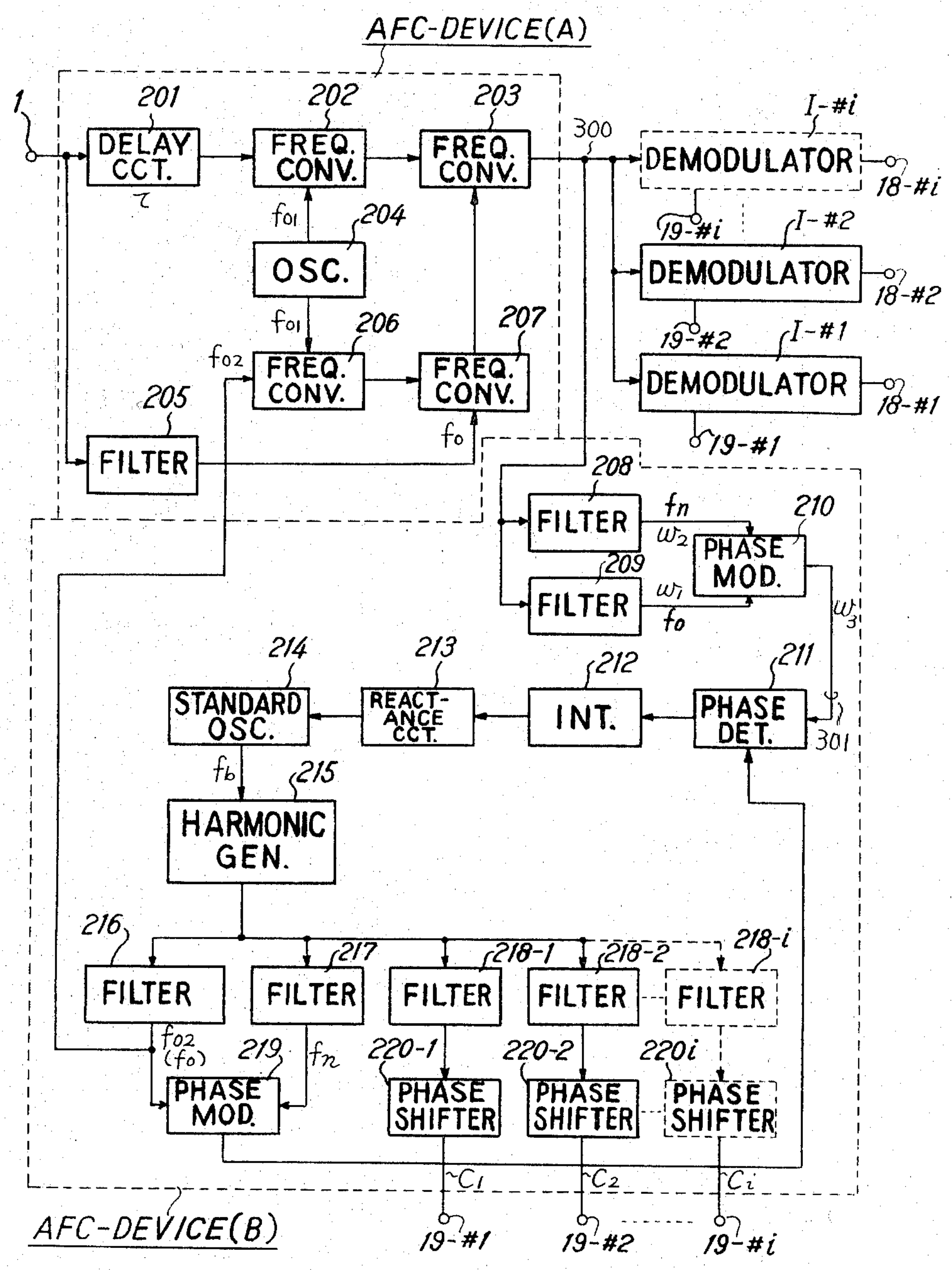

Referring to FIG. 4A, an embodiment of the reference carrier synchronizing system of this invention to receive the waves ($f_o$, $f_n$, $F_1$, $F_2$,...., $F_i$,....) transmitted from the sending side of FIG. 3A will be described. This arrangement comprises an AFC-device A, an AFC-device B and a plurality of demodulators (I–01, I–02,...., **I–0*i*,....). The AFC-device A is an automatic frequency control circuit to eliminate common-mode phase-fluctuation of the transmitted waves caused in the transmission medium. The AFC-device B is an automatic frequency control circuit to compensate the phase-deviation of the fundamental frequency $f_b$ and to generate a plurality of reference carrier waves $C_1$, $C_2$,...., $C_i$,.... . The demodulators I–01, I–02,...., I–0*i***,.... demodulate the transmitted, phase-modulated waves $F_1$, $F_2$,...., $F_i$,.... by use of the reference carrier waves $C_1$, $C_2$,...., $C_i$,.... .

The construction and operation of the AFC-device A will be first described. The transmitted waves $f_o$, $f_n$, $F_1$, $F_2$,...., $F_i$,.... are applied to the AFC-device A through an input terminal 1. To simplify the description, the phase-modulated waves $F_1$, $F_2$,...., $F_i$,.... are described as the respective carrier frequencies $f_1$, $f_2$,...., $f_i$,.... . If it is assumed that the carrier frequencies $f_1$, $f_2$,...., $f_i$,.... have frequency-spacings $\Delta f_i$ against the harmonic frequency $f_o$ (where $i$=0, 1, 2, 3,...., and $\Delta f_i$=0 in case of $i$=0), all of the transmitted frequencies can be indicated as follows:

$$\sum_{i=d}^{n} f_o \pm \Delta f_i$$

The harmonic frequency $f_o$ transmitted is selected by a filter 205 and applied to a frequency converter 207. To the other 205 and applied to a frequency converter 207, the difference $f_{o1}\sim f_{o2}$ between (or sum $f_{o1}+f_{o2}$ of) the output frequency $f_{o1}$ of an oscillator 204 and the output frequency $f_{o2}$ of a filter 216 is applied after frequency-conversion in a frequency converter 206. Outside and inside of the parentheses employed above and to be employed below correspond respectively. From the frequency converter 207, the sum $f_{o1}\widetilde{+}f_{o2}+f$ of (or difference $f_{o1}\widetilde{+}f_{o2}\sim f_o$ between) two input frequencies $f_{o1}+f_{o2}$ and $f_o$ of this converter 207 is derived and then applied to a frequency converter 203. Selection of this sum or difference is determined according to the principle in which the sum is selected in case $f_o< f_{o1}$ and the difference is selected in case $f_o>f_{o1}$. The transmitted waves $\Sigma f_o\pm\Delta f_i$ are passed through a delay circuit 201 having a delay time $\tau$ and applied to a frequency converter 202 from which the sum $f_{o1}+\Sigma f_o\pm f_i$ of (or difference $f_{o1}\sim\Sigma f_o\pm\Delta f_{ia}$ between) the transmitted waves $\Sigma f_o\pm\Delta f_i$ and the output frequency $f_{o1}$ of the oscillator 204 is derived and then applied to a frequency converter 203.

Actual examples of said frequencies are as follows. If the frequencies $f_o$, $f_{o1}$ and $f_{o2}$ are equal to 2820 Hz., 12,000 Hz. and 2820 Hz. respectively, the converter 202 selects frequencies Σ9180 Hz.$\pm\Delta f_i$ (or frequencies Σ14820 Hz.$\pm\Delta f_i$), the converter 206 selects a frequency 9180 Hz. (or a frequency 14820 Hz.), and the converter 207 selects a frequency 12,000 Hz. or 6360 Hz. (or a frequency 12,000 Hz. or 17,640 Hz.).

The delay time $\tau$ of the delay circuit 201 is so determined that an instantaneous fluctuated phase position of the transmitted harmonic wave $f_o$ passed through the delay circuit 201 and the frequency converter 202 is timed with an instantaneous fluctuated phase position of the transmitted harmonic wave $f_o$ passed through the filter 205 and the frequency converter 207.

Moreover, phase position of all the transmitted waves $\Sigma f_o\pm\Delta f_{ia}$ are usually fluctuated by the same value of phase or frequency deviation in view of the result of our experimental test of some oversea long lines.

In said condition, if all the transmitted waves $\Sigma f_o\pm\Delta f_i$ are deviated in phase position or in frequency by a value $\Delta p$ in a delayed or lower direction, the harmonic frequency $f_o$ passed through the filter 205 is shifted to a frequency $f_o-\Delta p$. However, the output frequency of the frequency converter 206 is not shifted because this has no relationship with said shift. As a result of such condition, the output frequency of the frequency converter 207 is delayed in phase position or reduced in-frequency by the value $\Delta p$, thereby becoming a frequency $f_o\widetilde{+}f_{o2}+f1\Delta p$(or $f_{o1}+f_{o2}\sim f_o$). On the other hand, since all the transmitted waves $\Sigma f_o\pm\Delta f_i$ are also delayed in phase position or reduced in frequency by same value $\Delta p$, the output frequency of the frequency converter 202 is similarly shifted, thereby becoming a frequency $f_{o1}+\Sigma f_o\pm f_i$—÷ (or $f_{o1}\sim\Sigma f_o\pm\Delta f_i\Delta p$). Moreover, since the instantaneous fluctuated values included in two inputs of the frequency converter 203 coincide with each other due to the delay time $\tau$, if the difference between frequencies of two inputs of the frequency converter 203 is selected at the output side of the converter 203 the instantaneous fluctuations included in all the transmitted waves are substantially eliminated at this output side. At the same time, the output of the converter 203 becomes frequencies $\Sigma f_{o2}\pm\Delta f_i$. Accordingly, if the frequency $f_{o2}$ is equal to the frequency $f_o$, output frequencies of the frequency converter 203 coincide respectively to those of the transmitted waves $f_o$, $f_n$, $f_1$, $f_2$,...., $f_i$,.... . Of course, if the frequency $f_{o2}$ is higher or lower than the frequency $f_o$, frequencies of the transmitted waves are converted to different frequencies. In any case, the fluctuation component $\Delta p$ of common-mode can be eliminated from the transmitted waves.

If frequencies of the transmitted waves $\Sigma f_o\pm\Delta f_i$ are identically fluctuated in phase position or in frequency into the advanced or higher direction, the fluctuation component $\Delta p$ can be eliminated at the output side of the frequency converter 203 by similarly selecting the difference between frequencies of the two inputs of the converter 203.

Moreover, if the sum of two input frequencies is selected at either the frequency converter 202 or 207, the frequency converter 203 must select the sum of its two inputs to eliminate the fluctuation component $\Delta p$ since the fluctuation component $\Delta p$ assumes the opposite polarities at two inputs of the frequency converter 203.

As mentioned in details above, the fluctuation component $\Delta p$ of common-mode caused in the transmission medium is eliminated from the transmitted waves $\Sigma f_o\pm\Delta f_i$ in the AFC-device A, and the transmitted waves $\Sigma f_o\pm\Delta f_i$ are converted to frequencies $\Sigma f_{o2}\pm\Delta f_i$. In other words, if the frequency $f_{o2}$ is equal to the frequency $f_o$, output frequencies of the frequency converter 203 have the same frequencies as the transmitted waves $f_o$, $f_n$, $f_1$, $f_2$,...., $f_i$,.... respectively; and the phase positions of the output frequencies of the converter 203 have constant phase-relations against the phase position of frequency $f_{o2}$. Accordingly, if reference carrier waves $C_1$, $C_2$, $C_3$,...., $C_i$,.... are produced so as to have constant phase-relations respectively against the phase position of the frequency $f_{o2}$, the reference carrier waves $C_1$, $C_2$, $C_3$,...., $C_i$,.... would be synchronized with the phase modulated telegraphic waves respectively at the output side of the AFC-device A. This generation operation is performed in the AFC-device B as described below.

In the AFC-device B, the standard oscillator 214 generates a frequency equal to the fundamental frequency $f_b$. If necessary, the oscillator 214 may be composed of an oscillator of frequency $f_s$ and a divider to produce a fundamental frequency $f_b$. The fundamental frequency $f_b$ is applied to a harmonic generator 215 from which higher harmonic frequencies of the fundamental frequency $f_b$ are generated. If the fundamental frequency $f_b$ of the sending side is equal to 60 Hz., the fundamental frequency $f_b$ of this AFC-device B is also equal to 60 Hz. The harmonic frequencies are applied to filters 216, 217, 218–1, 218–2,...., 218–$i$,.... . From the filters 216 and 217, frequencies $f_o$ and $f_n$ are derived. The filters 218–1, 218–2,...., 218–$i$,.... select respectively frequencies of reference carrier waves $C_1$, $C_2$,...., $C_i$,.... which are applied, through phase shifters 220–1, 220–2,...., 220–$i$,.... respectively, to demodulator I–01, I–02,...., I–0$i$,.... .

In this case, if the fundamental frequency $f_b$ has the same frequency and phase position at the sending side and the AFC-device B, the reference carrier waves $C_1$, $C_2$,...., $C_i$,.... will be completely synchronized with the respective required phase positions necessary to demodulate the transmitted phase modulated telegraphic waves $F_1$, $F_2$,...., $F_i$,.... . However, if the fundamental frequency $f_b$ is deviated by a little value, frequency or phase deviations of all the transmitted waves $f_o$, $f_n$, $F_1$, $F_2$,...., $F_3$,.... are different from one another since multiplied times of the fundamental frequency $f_b$ are different from one another as to the waves $f_o$, $f_n$, $F_1$, $F_2$,...., $F_i$,.... . Accordingly, these deviations are of uncommon-mode which cannot be compensated in the AFC-device A and is rather enlarged in the AFC-device A. This phenomenon will be described below with respect to an actual example.

If it is assumed that the fundamental frequency $f_b$ (60 Hz.) of the sending side is shifted to a frequency 60.1 Hz. and the frequencies $f_o$ (60 Hz.×47=2820 Hz.) and $f_1$ (60 Hz.×9=540 Hz.) are shifted to frequencies $f'_o$ (60.1 Hz.×47=Bw2824.7 Hz.) and $f'_1$ (60.1×9540.9 Hz.), respectively, this frequency 2824.7 Hz. is corrected to the frequency $f_{o2}$ (2820 Hz.) in the AFC-device A as mentioned above. In other words, the frequency $f'$ (2824,7 Hz.) becomes lower, by a frequency 4.7 Hz. In this operation, the frequency $f'_1$ (540.9 Hz.) becomes similarly a frequency 536.2 Hz. lower, by a frequency 4.7 Hz., than the frequency 540.9 Hz. This frequency 536.2 Hz. is lower, by a frequency 3.8 Hz., than the required frequency 540 Hz. As understood from the above description, the frequency variations of the transmitted, phase modulated telegraphic waves caused by the deviation of the fundamental frequency $f_b$ cannot be eliminated in the AFC-device A. The control operation of the AFC-device B for elimination such deviations will be described below.

Figure 5:
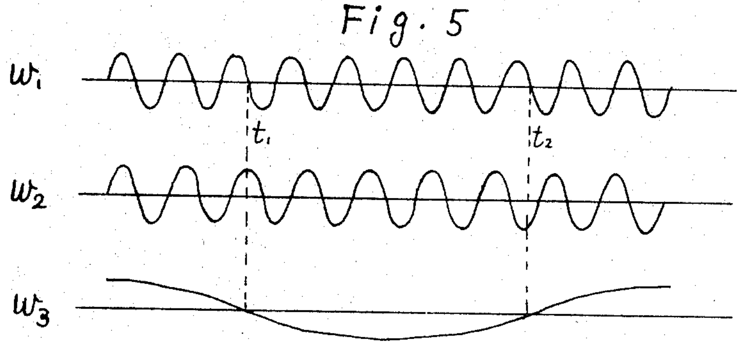
FIGS. 5, 7, 9 and 11 are waveform diagrams for describing the operations of the detection circuits.

The harmonic frequency $f_n$ (60 Hz. × 48 = 2880 Hz.) is deviated to a frequency $f'_n$ (60.1 Hz. × 48 = 2884.8 Hz.) in accordance with the deviation (from 60 Hz. to 60.1 Hz.) of the fundamental frequency $f_b$ (60 Hz.). This deviated frequency $f'_n$ (2884.8 Hz.) becomes a frequency 2880.1 Hz. in accordance with the frequency shift (4.7 Hz.) of the frequency $f'_o$ (2884.7 Hz.) in the AFC device A. These frequencies $f_o$ (2820 Hz.) and $f_n$ (2880.1 Hz.) are respectively passed through filters 209 and 208 and applied to a phase modulator 210 in which a difference (60.1 Hz.) between the frequencies $f_o$ (2820 Hz.) and $f_n$ (2880.1 Hz.) is detected as is illustrated in FIG. 5. In this FIG. 5, waves $w_1$, $w_2$ and $w_3$ show respectively the frequencies $f_o$ (2820 Hz.) and $f_n$ (2880.1 Hz.) and the difference frequency (60.1 Hz.). The detected difference frequency $w_3$ (60.1 Hz.) is applied to one input terminal of a phase detector 211. On the other hand, the filter 216 and 217 select respectively the frequencies $f_o$ (2820 Hz.) and $f_n$ (2880 Hz.) controlled from the oscillator 214. The difference frequency (60 Hz.) between the frequencies $f_o$ (2820 Hz.) and $f_n$ (2880 Hz.) is derived from a phase modulator 219 and applied to the other input terminal of the phase detector 211. In the detector 211, the magnitude and sign of the difference between frequencies (60.1 Hz. and 60 Hz.) of two inputs of the detector 211 are detected as a DC voltage. The detected DC voltage has the magnitude proportional to the magnitude of the difference (0.1 Hz.) and the polarity corresponding to the sign of the difference (o.1 Hz.) and is applied, through an integrator such as a low pass filter, to a reactance circuit 213 to control the frequency of the standard oscillator 214.

Accordingly, the frequency $f_b$ of the oscillator 214 is controlled so as to make the DC output voltage of the phase detector 211 zero. As the result of the above-mentioned control operation, the fundamental frequency (60 Hz.) becomes (60.1 Hz.) and the frequency $f_{o2}$ (2820 Hz.) becomes a frequency (2824.7 Hz.) which is the same as the frequency (2824.7 Hz.) of the transmitted harmonic frequency $f_o$. Accordingly, frequencies of the transmitted waves $f_o$, $f_n$, $F_1$, $F_2$,....,$F_i$.... appear at the outside of the AFC device A as they are, but the fluctuation components $\Delta p$ of common-mode are all eliminated. In it is case, frequencies of two inputs of the phase modulator 211 are equal to a frequency (60.1 Hz.), and the fundamental frequency $f_b$ of the oscillator 214 is also equal to the frequency (60.1 Hz.) which is the same as the present fundamental frequency $f_b$ (60.1 Hz.) of the sending side. According to such operation, the fundamental frequency $f_b$ of the receiving side is completely synchronized with the fundamental frequency $f_b$ of the sending side. Since the transmitted phase-modulated telegraphic waves $F_1$, $F_2$,...., $F_i$,.... are produced from the fundamental frequency $f_b$ of the sending side, the reference carrier waves $C_1$, $C_2$,...., $C_i$,.... produced from the fundamental frequency $f_b$ of the receiving side have proper phase positions to demodulate the transmitted phase-modulated telegraphic waves $F_1$, $F_2$,...., $F_i$,.... . The reference carrier waves $C_1$, $C_2$,.... $C_i$,.... are applied, through terminals 19–01, 19–02,...., 19–0$i$,...., to the demodulators I–01, I–02,...., I–0$i$,.... respectively. Demodulated telegraphic signals are derived from terminals 18–01, 18–02,...., 18–0$i$,.... . The phase shifter 220–1, 220–2,...., 220–$i$,.... are employed to carry out minor adjustments of the reference carrier waves $C_1$, $C_2$,...., $C_i$,.... .

Since the reference carrier waves $C_1$, $C_2$,...., $C_i$,.... are completely synchronized with the respective proper phase positions for demodulating the transmitted phase-modulated telegraphic waves $F_1$, $F_2$,...., $F_i$,.... in accordance with the synchronizing system of this invention, stable transmission of the telegraphic signals according to the fixed reference phase modulation as well as the differential phase-modulation can be realized. The phase-modulators 106–1, 106–2,...., 106–$i$... and the demodulators I–01, I–02,...., I–0$i$,.... are designed in accordance with the kind of phase-modulation (i.e.; the fixed reference phase-modulation or the differential phase-modulation) and the number of quantum phase positions of each of the phase-modulated telegraphic waves.

As mentioned above, a feature of this invention is that phase information of the fundamental frequency $f_b$ of the sending side is transmitted by use of the phase-relation between two harmonic waves (e.g.; $f_o$ and $f_n$) derived from the fundamental frequency $f_b$. If necessary, the number of harmonic waves can be increased more than two.

Figure 3B:
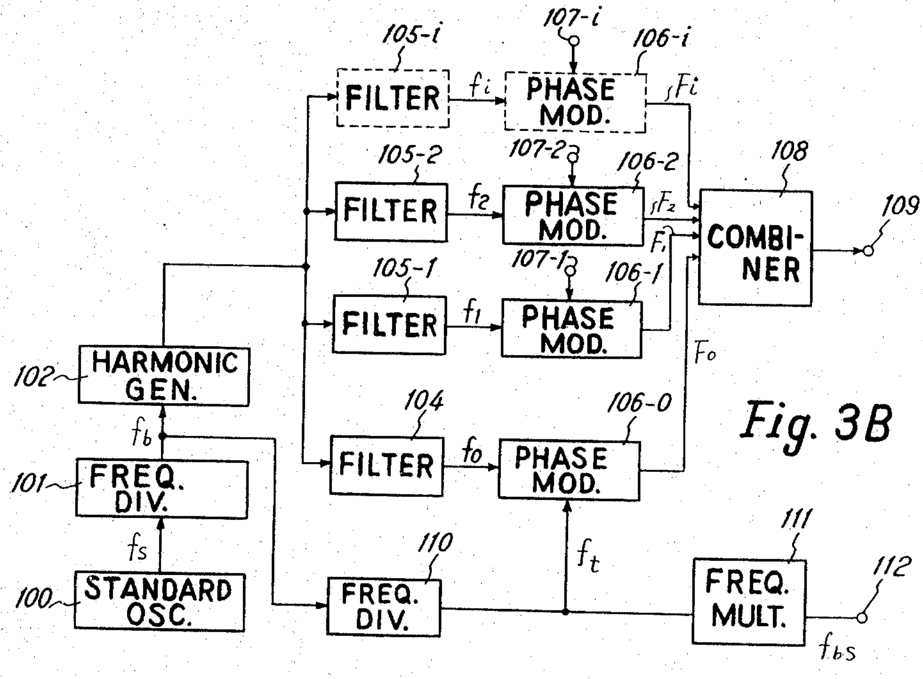

The said phase information can be transmitted by a phase-modulated synchronization wave, and moreover timing-information necessary for bit-synchronization of all the telegraphic signals to be transmitted can be included in the phase-modulated synchronization wave. FIG. 3B shows an example of the sending-side according to this principle. In this arrangement, the fundamental frequency $f_b$ is divided at a frequency divider 110 into a timing frequency $f_t$ (e.g.; 6 Hz.). The harmonic frequency $f_o$ is phase-modulated, at a phase-modulator 106–0, by the timing frequency $f_t$, so that the phase-modulated synchronization wave $F_o$ is obtained at the output side of the phase modulator 106–0 and applied to the combiner 108 to transmit it to the receiving side. The frequency multiplier 111 is employed for generating a bit-synchronization frequency $f_{bs}$ (e.g.; 48 Hz. for a telegraph speed 96 Bauds) which is supplied, through a terminal 112, to a bit-synchronization means (not shown) to be arranged before the input terminals 107–1, 107–2,...., 107–$i$,.... . Other parts are equivalent to the parts of the arrangement of FIG. 3A.

Figure 4B:
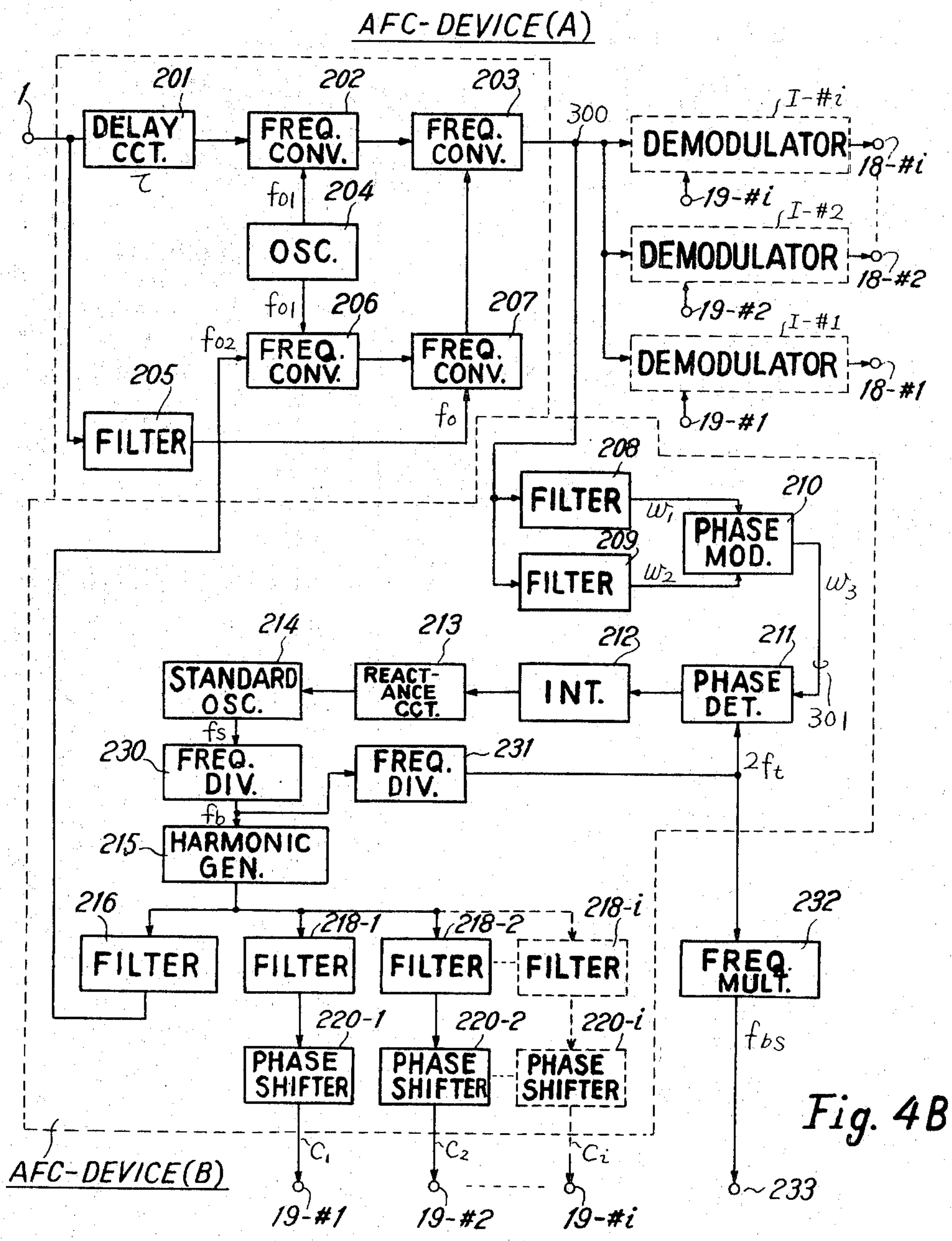

FIG. 4B shows an embodiment of this invention to synchronize the phase-modulated wave transmitted from the sending side shown in FIG. 3B. Only the constitutional parts and operations different from the embodiment of FIG. 4A will be described. An upper side band component $w_1$ and a lower side band component $w_2$ of the phase-modulated synchronization wave $F_o$ are selected by filters 208 and 209 respectively and applied to a phase-modulator 210, in which a difference frequency (12 Hz.) between the frequencies $w_1$ and $w_2$ is detected as shown in FIG. 5. This operation is similar to the arrangement of FIG. 4A. On the other hand a frequency divider 231 derives a frequency (12 Hz.) equal to twice the timing frequency $f_t$ from the fundamental frequency $f_b$ of the output of a frequency divider 230. At the phase detector 211, the phase difference between the wave $w_3$ and the timing frequency $f_t$ is detected and applied to the reactance circuit 213, through an integrator 212, to control the frequency of the oscillator 214. Other operations are similar to those of the arrangement shown in FIG. 4A, so that details are omitted. A frequency multiplier 232 produces the bit-synchronization frequency $f_{bs}$(e.g. 48 Hz.) from the output frequency ($2f_t$) of the frequency divider 231 and supplies it to the demodulators I–01, I–02,....,I–03,.... as bit-synchronization information through a terminal 233. Since the fundamental frequency $f_b$ of the receiving side is synchronized with the fundamental frequency $f_b$ of the sending side as mentioned above with reference to FIG. 4A, the bit-synchronization frequency $f_{bs}$is also synchronized with that of the sending side.

Figures 6, 7:
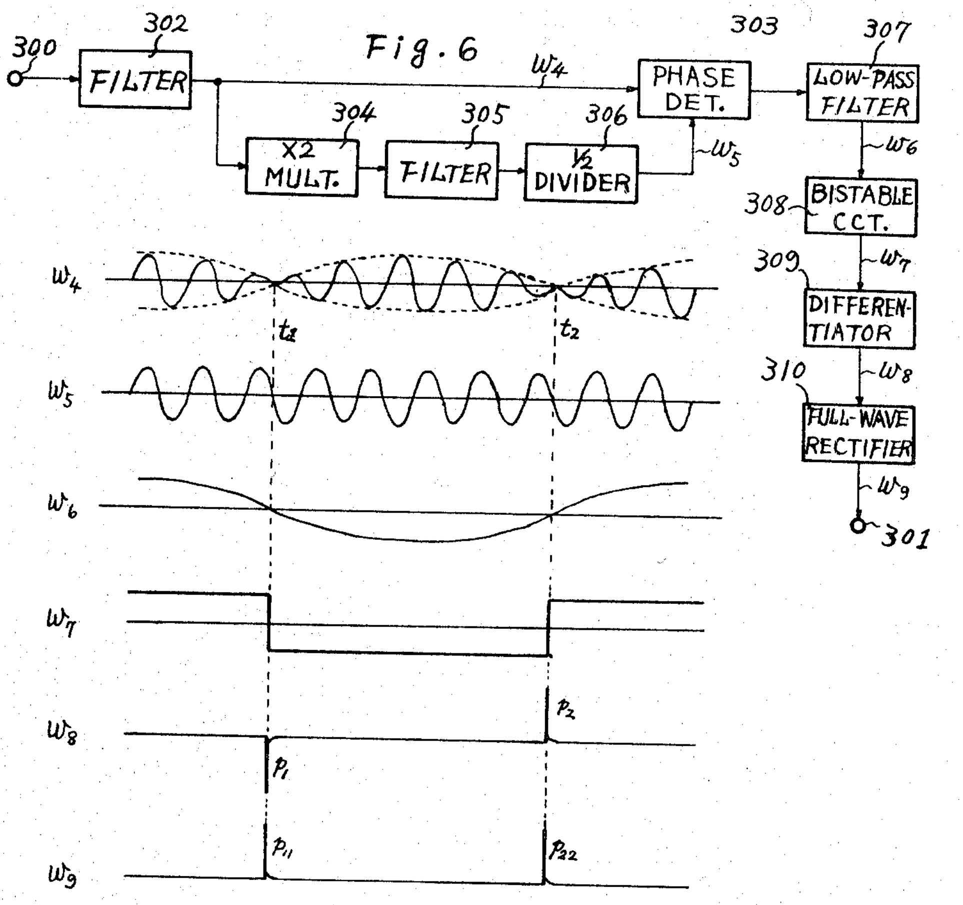
FIGS. 6, 8 and 10 are block diagrams for illustrating respectively examples of the detection circuit of phase-relation to be used in the system of this invention.

The detection circuit for detecting the phase-relation between two harmonic frequencies of the fundamental frequency $f_b$ may be modified from the arrangement shown in FIGS. 4A and 4B. FIG. 6 shows a modification of the detection circuit. The constitution and operation of the modification will be described with reference to FIGS. 6 and 7. A filter 302 is connected to a junction 300 (FIGS. 4A and 4B) and selects two harmonic frequencies e.g.; $f_o$ and $f_n$). Accordingly, the output wave of the filter 302 ($w_4$ in FIG. 7) assumes phase-positions which are alternately reversed in a period corresponding to the difference frequency between the selected two harmonic frequencies. A frequency multiplier 304 multiplies, by two times, the wave $w_4$. The multiplied frequency is selected by a filter 305 and divided into a half frequency $w_5$ at a divider 306. Accordingly the frequency $w_5$ has a half frequency of the sum of two harmonic frequencies. The phase difference between frequencies $w_4$ and $w_5$ is detected at a phase detector 303, which produces a DC voltage $w_6$ after a low-pass filter 307. A bistable circuit 308 generates a rectangular wave $w_7$ which has significant instants $t_1$, $t_2$,.... corresponding to zero-crossing times of the wave $w_6$. The significant instants $t_1$, $t_2$,.... are detected by a differentiator 309 as a pulse signal $w_8$ ($p_1$, $p_2$,....), which are changed to a pulse signal $w_9$ ($p_{11}$, $p_{22}$,.... of the same polarity) at the full-wave rectifier 310. The pulse signal $w_9$ is applied to the phase detector 211 and samples the other input signal of the phase detector 211. If the filters 216 and 217 are designed so that the other input signal of the phase detector 211 has a frequency equal to twice the frequency of the wave $w_6$, the phase detector 211 produces a DC voltage which has the magnitude proportional to the phase difference between two inputs of the phase detector 211 and has the sign of the phase difference.

Figure 8:
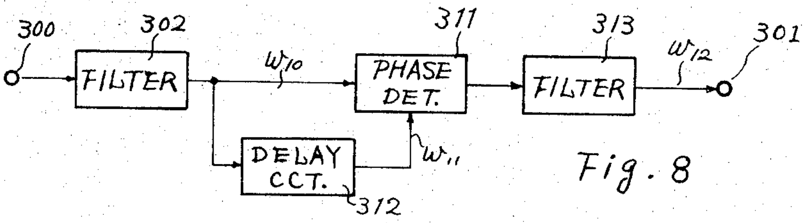
Figure 9:
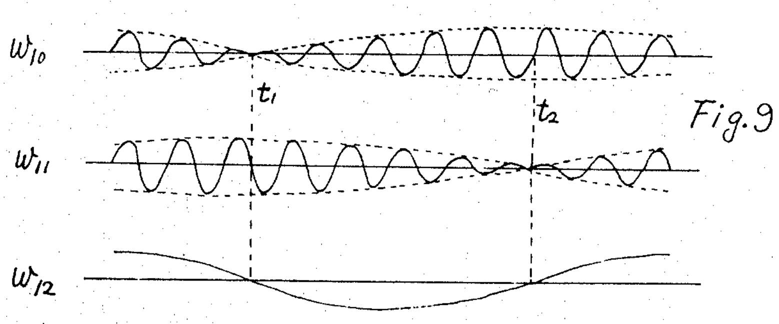

FIG. 8 shows another example of the detection circuit. The operation of this circuit will be described with reference to FIG. 9. A filter 302 select two harmonic frequencies (e.g.; $f_o$ and $f_n$) from the joint 300 to apply them to a phase detector 311 as a wave $w_{10}$. The wave $w_{10}$ is delayed, by a half period of the difference frequency between two harmonic frequencies, in a delay circuit 312, and the delayed wave $w_{11}$ is also applied to the phase detector 311. At the phase detector 311, the phase difference between the waves $w_{10}$ and $w_{11}$ is detected and applied to the terminal 301 through a low-pass filter 313. The following operation is similar to the arrangement shown in FIG. 4A.

Figure 10:
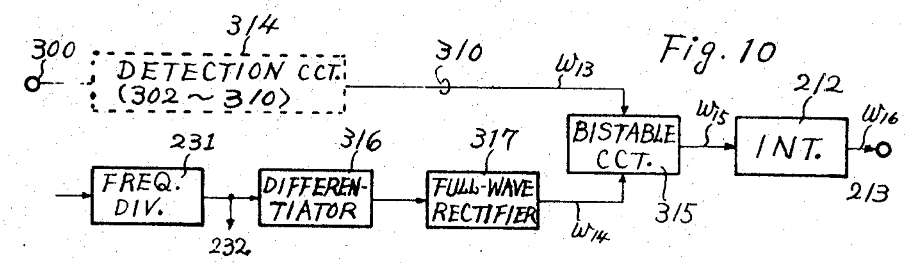
Figure 11:
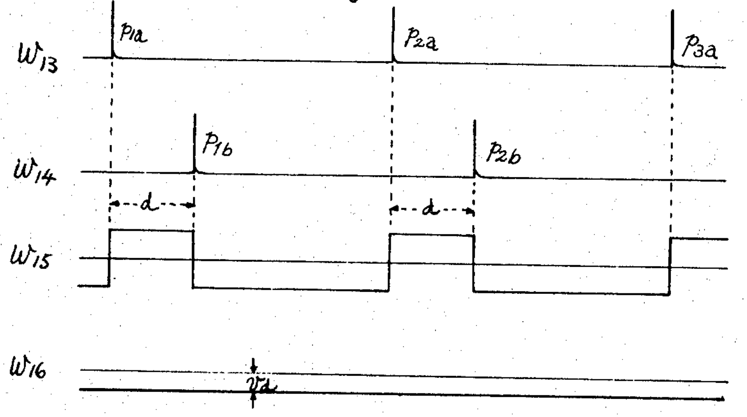

FIG. 10 shows a further example of the detection circuit. The operation of this circuit will be described with reference to FIG. 11. A detection circuit 314 is similar to the circuits 302 to 310 and produces a pulse signal $w_{13}$ to apply it to a bistable circuit 315 as set-pulses. The reset input pulses $w_{14}$ of the bistable circuit 315 is derived from the frequency divider 231 (FIG. 4B) through a differentiator 316 and a full-wave rectifier 317. The phase difference $d$ between two input pulse signals $w_{13}$ and $w_{14}$ are detected by the bistable circuit 315. The wave $w_{15}$ is the detected output signal of the bistable circuit 315. A DC voltage $v_d$ of a wave $w_{16}$ is obtained by smoothing the wave $w_{15}$ in an integrator 212. The DC output $w_{16}$ is applied to a reactance circuit 213 of FIG. 4B. Accordingly, this detection circuit can be applied to the circuit arrangement of FIG. 4B.

As mentioned above, phase-information indicative of the phase relation between two harmonic frequencies of the fundamental frequency of the sending side can be detected in the state of analogue information or digital information. Moreover, phase-information indicative of the phase relation between two harmonic frequencies of the fundamental frequency of the receiving side can be also detected in the state of analogue information or digital information. These two kinds of phase-information are applied to phase-detection means (e.g.; the phase detector 211 or the bistable circuit 315) to detect the phase difference between two phase-information. The phase position of the fundamental frequency $f_b$ of the receiving side is controlled by use of the phase difference so as to synchronize with the phase position of the fundamental frequency $f_b$ of the sending side. The reference carrier waves $C_1$, $C_2$,..., $C_i$,.... are produced by use of the fundamental frequency $f_b$ synchronized with that of the sending side. Moreover, the fluctuations of the transmitted waves ($f_o$, $f_n$, $F_1$, $F_2$,.... etc.) in the transmission medium are eliminated at the AFC device A. Accordingly, the reference carrier waves $C_1$, $C_2$,...., $C_i$,.... generated by the carrier synchronizing system of this system are able to demodulate the transmitted, phase-modulated waves without erroneous detection.

As the demodulation circuits I–01, I–02,...., I–0*i*,...., any type of the phase-demodulation circuit can be employed. If the phase-modulated telegraphic waves $F_1$, $F_2$,...., $F_i$,.... are allocated at the respective spacing 1/T (where T is the duration of an element signal of the telegraphic signal) between adjacent phase-modulated waves and the demodulator provides with a start-stop integrator e.g.; integrator 3–1 and 3–2 in FIGS. 1 and 2) timed with the bit-synchronization signal, the demodulator has no use of any selection filter to select the respective phase-modulated waves.

While we have described particular embodiments of our invention, it will, of course, be understood that we do not wish our invention to be limited thereto, since many modifications may be made and we, therefore, contemplate by the appended claims to cover all such modifications as fall within the true spirit and scope of our invention.

We claim:

1. A reference carrier wave synchronizing system for synchronizing a plurality of reference waves with a plurality of transmitted phase-modulated telegraphic waves each having a harmonic frequency of fundamental low frequency, and each assuming $2^n$ quantum phase positions in accordance with the number $n$ of telegraph channel or channels to be transmitted on each of the telegraphic waves, the phase information of the fundamental low frequency being transmitted by a phase relation between two harmonic signals of the fundamental low frequency, said system comprising:

an oscillator for generating a signal of a frequency equal to the fundamental low frequency;

a harmonic generator coupled to the oscillator to generate a plurality of said reference waves by the use of the output of the oscillator;

input terminal means for receiving said transmitted two harmonic signals and a plurality of said transmitted phase-modulated telegraphic waves;

common-mode compensation means coupled to said input terminal means and said harmonic generator for eliminating common-mode fluctuations in phase positions of the transmitted phase-modulated telegraphic waves and the transmitted two harmonic signals by equalizing the frequency of one of said transmitted phase-modulated telegraphic waves to the frequency of a corresponding one of said reference waves generated from the harmonic generator, said common-mode compensation means having output means for providing a plurality of compensated phase-modulated telegraphic waves and two compensated harmonic signals;

a first phase modulator coupled to the output means of the common-mode compensation means to detect a first difference frequency between said two compensated harmonic signals;

a second phase modulator coupled to said harmonic generator to detect a second difference frequency between two harmonic signals generated from the harmonic generator and having respectively the same frequencies as the transmitted two harmonic signals;

phase detection means coupled to the first and second phase modulators to detect a phase difference between the first and second difference frequencies; and means coupled between said phase detection means and said oscillator for controlling the frequency of the oscillator to make the output of the phase detection means zero, whereby a plurality of said reference waves are synchronized with a plurality of said compensated phase-modulated telegraphic waves.

2. A reference carrier wave synchronizing system according to claim 1, in which both of the first and second phase modulators detect the first and second difference frequencies in the state of analogue signals.

3. A reference carrier wave synchronizing system according to claim 1, in which at least one of said first and second phase modulators comprises a filter for selecting said two harmonic signals, a frequency multiplier connected to said filter for doubling the frequencies of the two harmonic signals, frequency division means coupled to said frequency multiplier to generate a half frequency signal equal to a half frequency of the sum of the frequencies of said two harmonic signals, a phase detector coupled to said frequency division means and said filter for detecting as an analogue signal the phase difference between the two harmonic signals and the half frequency signal, and means coupled to said phase detector for detecting a pulse train having pulses which are timed with zero-crossing times of the analogue signal derived from the phase detector.

4. A reference carrier wave synchronizing system according to claim 1, in which at least one of the first and second phase modulators comprises a filter for selecting said two harmonic signals, a delay circuit connected to said filter for delaying said selected two harmonic signals by a half period of the difference frequency between said two harmonic signals, and a phase detector coupled to the filter and the delay circuit to detect the phase difference between the outputs of the filters and the delay circuit.

5. A reference carrier wave synchronizing system for synchronizing a plurality of reference waves with a plurality of transmitted phase-modulated telegraphic waves each having a harmonic frequency of a fundamental low-frequency and each assuming $2^n$ quantum phase positions in accordance with the number $n$ of telegraph channel or channels to be transmitted on each of the telegraphic waves, the phase information of the fundamental low frequency being transmitted by a phase-reference harmonic signal having a harmonic frequency of the fundamental low frequency and phase-modulated by a low harmonic frequency of the fundamental low frequency, said system comprising:

an oscillator for generating a signal of a frequency equal to the fundamental low frequency;

a harmonic generator coupled to the oscillator to generate a plurality of said reference waves by the use of the output of the oscillator;

input terminal means for receiving said transmitted low harmonic frequency and a plurality of said transmitted phase-modulated telegraphic waves;

common-mode compensation means coupled to said input terminal means and said harmonic generator for eliminating common-mode fluctuations in phase positions of the transmitted phase-modulated telegraphic waves and the transmitted phase-reference harmonic signal by equalizing the frequency of one of said transmitted phase-modulated telegraphic waves to the frequency of one of said reference waves generated from the harmonic generator, said common-mode compensation means having output means for providing a plurality of compensated telegraphic waves and a compensated phase-reference harmonic signal;

a phase modulator coupled to the output means of the common-mode compensation means to detect a difference frequency between two sideband signals of said compensated phase-reference harmonic signal;

a frequency divider coupled to the oscillator to divide the frequency of the output of the oscillator so as to obtain a timing frequency equal to twice the lower harmonic frequency;

phase detection means coupled to the phase modulator and the frequency divider to detect a phase difference between the difference frequency of the phase modulator and the timing frequency of the frequency divider; and means coupled between said detection means and said oscillator for controlling the frequency of the oscillator by the use of the output of the phase detection means to make the output of the phase detection means zero, whereby a plurality of said reference waves generated from the harmonic generator are synchronized with a plurality of said compensated phase-modulated telegraphic waves.

6. A reference carrier wave synchronizing system according to claim 5, in which the phase modulator comprises a filter for selecting the phase-reference harmonic signal, a frequency multiplier connected to the filter for doubling the frequency of the phase-reference harmonic signal, division means coupled with the output of the frequency multiplier to generate the same unmodulated frequency as the frequency of the phase-reference harmonic signal, phase detector means coupled to the filter and the division means for detecting as an analogue signal the phase difference between the phase-reference harmonic signal and the unmodulated frequency, and first means coupled to the phase detector for detecting a train having pulses which are timed with zero-crossing times of the analogue signal derived from the phase detector; and in which said system further comprises second means coupled between the frequency divider and the phase detection means for detecting a pulse train having pulses which are timed with zero-crossing times of the timing frequency signal.

7. A reference carrier wave synchronizing system according to claim 6, in which the phase detection means is a bistable circuit set by one of two inputs thereof and reset by the other of two inputs thereof.